Oct. 8, 1957 E. C. WELCH 2,809,335
INCREMENTAL STEPPER MOTOR
Filed Feb. 20, 1956 2 Sheets-Sheet 1

INVENTOR.
ELVIN C. WELCH
BY Elliott & Pastoriza
ATTORNEYS

Oct. 8, 1957  E. C. WELCH  2,809,335
INCREMENTAL STEPPER MOTOR
Filed Feb. 20, 1956  2 Sheets-Sheet 2
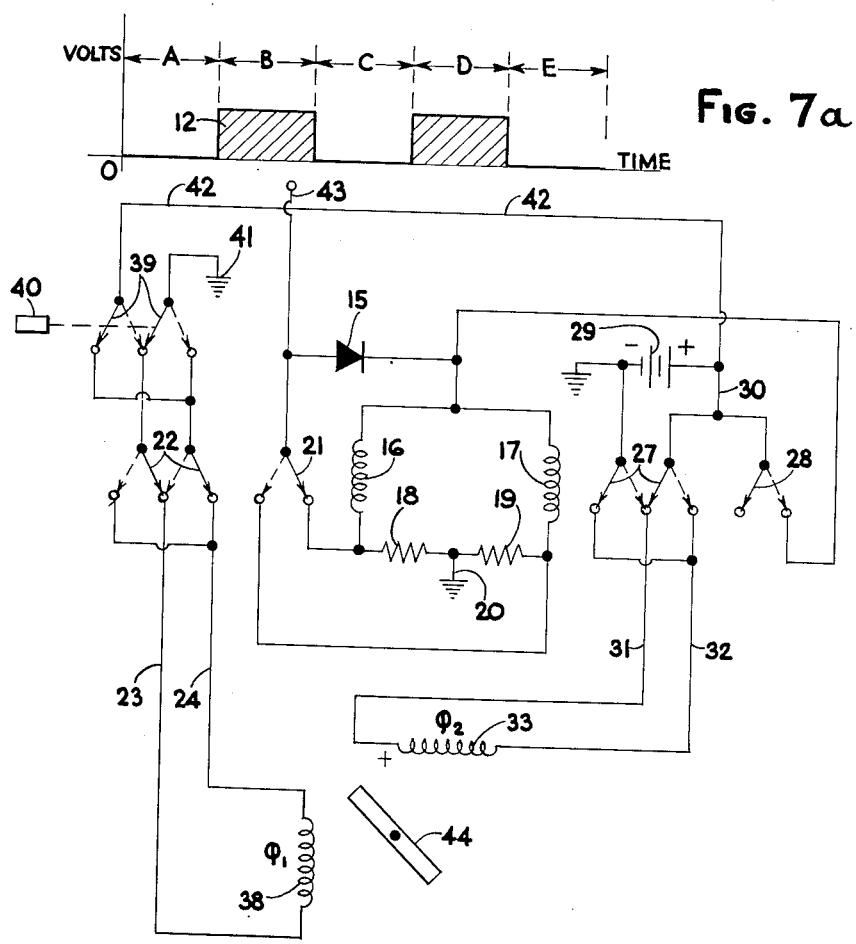
Fig. 7a
Fig. 7
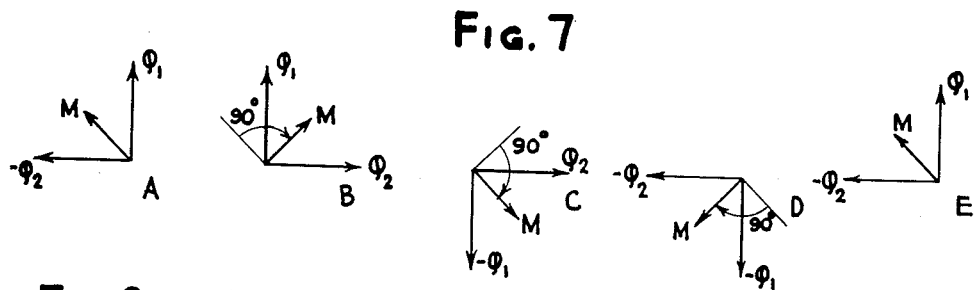
Fig. 8   Fig. 9   Fig. 10   Fig. 11   Fig. 12
INVENTOR.
ELVIN C. WELCH
BY Elliott & Pastoriza
ATTORNEYS United States Patent Office 2,809,335
Patented Oct. 8, 1957

2,809,335

INCREMENTAL STEPPER MOTOR

Elvin C. Welch, Inglewood, Calif., assignor to Automation Development Corporation, a corporation of California Application February 20, 1956, Serial No. 566,420

10 Claims. (Cl. 318—139)

This invention relates generally to electrical control systems, and more particularly to a motor control system in which a shaft is caused to rotate in discrete steps in response to electrical pulses.

There are many scientific and industrial requirements for a device which will translate electrical pulses into discrete increments of mechanical shaft rotation. Some of the uses for such a device, for example, are in automatic machine tool control, conversion of digital computer data into analogue form which is acceptable as an input to an analogue type computer, and remote positioning of valves and controls in industrial processes.

It is a primary object of the present invention accordingly, to provide an improved incremental stepper motor of the above type which is simple and reliable in operation and is characterized by an extremely long life.

Another important object is to provide a stepper motor responsive to electrical pulses in which the torque versus shaft rotation characteristics of the motor are such as to avoid excessive wear on the load driven by the shaft.

Briefly, these and other objects and advantages of this invention are attained by providing stator windings capable of establishing first and second magnetic fields at right angles to each other. Suitable actuating and reversing means responsive to electrical input pulses are arranged to change the polarity of the connections to the stator windings or to de-energize one of the windings whereby the first and second magnetic fields are reversed 180° in direction or one of the fields alternately de-energized. By sequentially and alternately controlling the two fields, the magnetic field representing the resultant or vector sum of these two stator fields can be made to rotate in discrete steps in either direction.

A rotor member is provided either with windings or a permanent magnet to establish a magnetic field, interacting with the resultant stator field so that the rotor is caused to rotate in steps to maintain the position of its magnetic field in alignment with the resultant stator magnetic field. The torque tending to rotate the rotor is a trigonometric function of the angle between the rotor magnetic field and the resultant stator magnetic field established by the stator windings so that the initial acceleration and terminal deceleration of a load connected to the rotor shaft are relatively low. As a result, excessive wear on the load or shaft driven by the rotor is avoided.

In a first embodiment of the invention, the actuating and reversing means are arranged such that two square wave pulses will serve to drive the rotor through 360° in alternate steps of 135° and 45°. In a second embodiment, the rotor is driven in equal steps of 90°.

A better understanding of the invention will be had by referring to the accompanying drawings in which:

Figure 7 is a schematic circuit diagram illustrating a second embodiment of the stepper motor;

Figure 7a is a pulse diagram of electrical input pulses supplied to the circuit of Figure 7; and Figures 8 through 12 are vector diagrams illustrating the operation of the circuit of Figure 7.

Figure 1A:
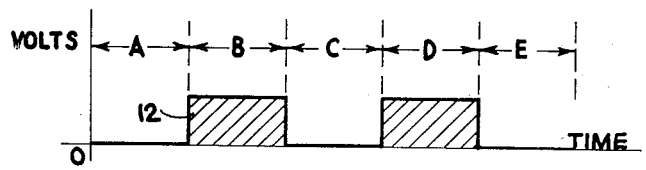
Figure 1a is a pulse diagram of electrical input pulses supplied to the circuit of Figure 1.
Figure 1:
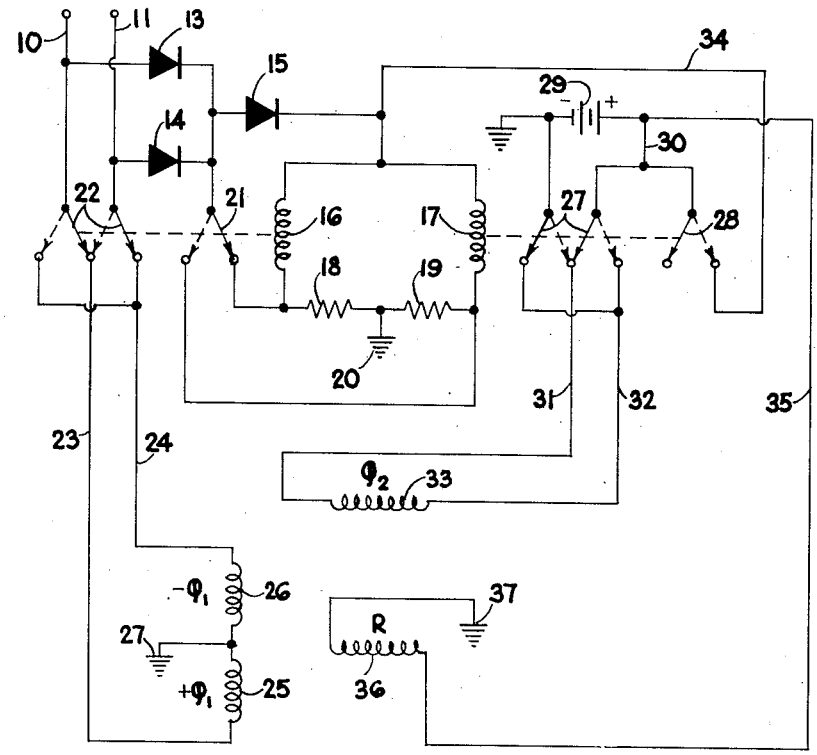
Figure 1 is a schematic circuit diagram illustrating a first embodiment of the incremental stepper motor of this invention.
Figure 2:
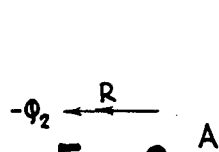
Figures 2 through 6 are vector diagrams useful in explaining the operation of the circuit of Figure 1.

Referring first to Figure 1, there is shown in the upper left hand corner of the circuit two input leads 10 and 11. These leads are adapted to receive electrical pulses in the form of square wave pulses such as 12 illustrated graphically in Figure 1a above the input terminals. The electrical pulses are applied either to the input terminal 10 or the input terminal 11 depending upon which direction it is desired to have the stepper motor rotate.

From the input leads 10 and 11 there are provided branch leads including rectifiers 13 and 14 respectively, both connecting to the input of a rectifier 15 which in turn connects to the top of first and second actuating means in the form of relay coils 16 and 17. The coils 16 and 17 serially include respectively, resistances 18 and 19 connected to ground at 20.

The relay coil 16 is arranged to actuate a control switch arm 21 and simultaneously, reversing switch arms 22. As shown, the upper end of the control switch arm 21 connects to the output junction point of rectifiers 13 and 14 and the input to rectifier 15 and is arranged in its unactuated or solid line position to engage a contact connecting to the junction point between the coil 16 and resistance 18. In its actuated or dotted line position, the control switch arm 21 connects to a terminal leading to the junction point of the relay coil 17 and resistance 19. The reversing switch arms 22 connect directly to the input leads 10 and 11 and in their unactuated or solid line positions engage terminal leads 23 and 24 connecting to the outside contacts of a split phase stator winding comprising coils 25 and 26. The inner ends of these coils are grounded at 27. In the actuated or dotted line position of the switch arms 22, the connection of the input leads 10 and 11 to the exterior contacts of the coils 25 and 26 are simply reversed.

The relay coil 17 is arranged to actuate second reversing switch arms 27 and simultaneously, a holding switch arm 28. The reversing switch arms 27 are connected across a source of electrical energy schematically illustrated as a battery 29. The voltage of the battery 29 is no greater than the voltages of the pulses such as the pulse 12. In the unactuated or solid line position of the reversing switch arms 27, the battery 29 is connected across a pair of leads 31 and 32 connected to a second stator winding 33 oriented to generate a magnetic field at right angles to the magnetic field established by either stator winding 25 or 26. Actuation of the reversing switch arms 27 to the dotted line position by the relay 17 simply reverses the polarity of these connections from the battery 29. The holding switch arm 28 in its unactuated or solid line position engages an open contact. In its actuated or dotted line position, the switch arm 28 connects the positive side of the battery 29, through the lead 30, to terminal lead 34 which in turn is connected to the top of the relay coils 16 and 17.

Also connected to the positive side of the battery 29 is a lead 35 for continuously energizing a rotor winding 36 grounded at its other end at 37. The rotor winding will establish a magnetic field which will interact either with the magnetic field established by the coil 25 and the coil 33 or with the magnetic field established by the coil 26 and the coil 33 to cause the rotor to rotate into a position such that its magnetic field will align itself with the resultant stator magnetic field of the two magnetic fields at right angles established by the stator windings.

Referring now to Figures 2, 3, 4, 5 and 6 as well as

Figure 1, the operation of the system will be described. Consider first the position of the various components before any pulse is applied. For example, in the interval A in the graph of Figure 1a immediately above the input terminals 10 and 11, the relay coils 16 and 17 are de-energized and the various switches are in the positions shown in solid lines. Under these conditions, the first stator windings 25 and 26 are not energized inasmuch as no signal is being received in either of the terminals 10 and 11. The second stator winding 33, however, is energized through the switch arms 27 which connect the leads 31 and 32 to the opposite terminals of the battery 29. The magnetic field established by the stator winding 33 is in the direction indicated by the vector $-\varphi_2$ in Figure 2. Therefore, the magnetic field of rotor winding 36 will tend to align itself with that of the stator winding 33, and thus the rotor will rotate to lie in the same direction as indicated by the vector R in Figure 2.

Figure 3:
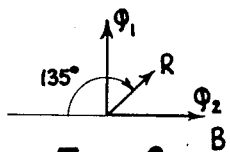

When the first pulse 12 is applied to the terminal 10, for example, it will pass down one of the reversing switch arms 22 through the lead 23 to the coil 25 and to ground at 27 thereby establishing a field designated $\varphi_1$ as shown in Figure 3. This field $\varphi_1$ will be maintained for the duration of the pulse 12; that is, during the interval B as shown in the graph of Figure 1a. The pulse 12 applied to the input lead 10 also passes through the rectifiers 13 and 15 to the top of the coils 16 and 17 and simultaneously passes through the control switch arm 21 to the junction of the coil 16 and the resistance 18. Since the same pulse is applied to the top and bottom of the coil 16 simultaneously, this relay coil will remain de-energized. The application of the pulse to the top of the relay coil 17, however, will energize this relay coil, the signal passing through the coil and resistance 19 to ground at 20. Energization of the relay coil 17 actuates the reversing switch arms 27 and holding switch arm 28 to their dotted line positions. When the reversing switch arms 27 move to the dotted line positions, the direction of the magnetic field established by the stator winding 33 is reversed, and will extend in the direction indicated by the vector $\varphi_2$ in Figure 3 which is 180° from the direction of $-\varphi_2$ shown in Figure 2. The holding switch 28 will also apply potential from the battery 29 by way of lead 30 to lead 34 and the top of both the relay coils 16 and 17, thereby locking the relay coil 17 in its energized position. This application of potential to the top of the relay 16 will not affect relay 16 since the pulse 12 of equal or greater potential during the interval B is still present at the bottom of the coil 16 through the control switch arm 21. Thus, during interval B or while the first pulse is being applied, the resultant of the first and second magnetic fields $\varphi_1$ and $\varphi_2$ established by the coils 25 and 33 respectively, lies in a direction 135° from the original direction shown in Figure 2, whereby the rotor will swing around to a position in alignment with this resultant as indicated in Figure 3.

Figure 4:
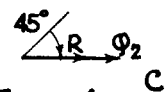

Upon cessation of the pulse 12; that is, at the end of interval B and the beginning of interval C, the potential due to the pulse 12 will no longer be applied to the junction point between the relay coil 16 and resistance 18 whereby energy from the battery 29 through the lead 34 to the top of the coil 16 will now energize relay coil 16 to throw the reversing switch arms 22 and control switch 21 to their dotted line positions. Also, with cessation of the pulse 12 at the end of interval B the pulse energy supplied to the stator winding 25 ceases thereby eliminating the $\varphi_1$ magnetic field. The movement of the control switch arm 21 to its dotted line position connects the input lead 10 to the junction point of the coil 17 and resistance 19, but since there is no signal during interval C the relay coil 17 is not affected and is still locked in by current from battery 29 and lead 34. Therefore, the vector $\varphi_2$ is precisely the same as in interval B and the rotor R will now align itself with this vector $\varphi_2$ as shown in Figure 4 for interval C by rotating through 45°.

Figure 5:
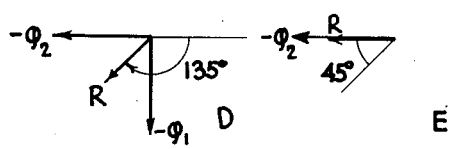
Figure 6:
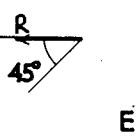

At the end of interval C and the beginning of the second pulse during interval D as shown in the graph of Figure 1a, the application of this second pulse to the lead 10 is passed through the rectifier 13 and the control switch arm 21, which is now in its dotted line position, to the junction point between the relay coil 17 and resistance 19 thereby cancelling the potential applied to the top of the coil 17 through the lead 34 from the battery 29. Relay coil 17 is thereby de-energized and the reversing switch arms 27 and holding switch 28 return to their solid line positions. Upon movement of the reversing switch arms 27 to their solid line positions, the magnetic field established by the coil 33 is again reversed to result in a $-\varphi_2$ vector as illustrated in Figure 5. The removal of potential through the lead 34 to the top of the coil 17 will not de-energize coil 16 inasmuch as the pulse during region D is being applied to the coil 16 and is not blocked by the control switch arm 21, since this arm is in its dotted line position. Also, this second pulse is applied to the reversing switch arms 22 which are in the dotted line position to excite the coil 26 resulting in a vector $-\varphi_1$ as shown in Figure 5. The result of the vectors $-\varphi_2$ and $-\varphi_1$ is in the direction indicated by the vector R of Figure 5, 135° from the former direction of the vector R in Figure 4. Therefore, the rotor R will rotate through 135° to align its field with this resultant.

Finally, upon cessation of the second pulse, that is, cessation of the interval D, the relay coil 16 will no longer be energized through the input lead 10, rectifier 13, and rectifier 15 in the absence of the pulse during interval E and thus the reversing switch arms 22 and control switch arm 21 will return to their solid line positions shown in Figure 1. In these positions and during interval E there is no energy applied to either of the coils 25 and 26 and there thus only remains the vector $-\varphi_2$. Thus, in region E, the vectors and fields are the same as were illustrated in Figure 2 and the mechanism has stepped through a complete cycle. Reception of the next two successive pulses simply repeats this cycle of events, the rotor first moving 135° and then 45° and then 135°, and finally 45° to complete a rotation of 360° in alternate steps of 135° and 45°.

If the pulses are initially applied to the input terminal 11 rather than the input terminal 10, the stator winding 26 is first energized rather than the stator winding 25 whereby the same cycle of events occurs except that the rotation of the resultant field is in an opposite direction to that already described. Thus, the stepper motor may be reversed in direction by simply applying the pulses to input lead 11 rather than input lead 10.

The rectifiers 13, 14, and 15 are necessary to isolate the input leads from themselves and from the source of potential 29 when the holding switch arm 28 is in its dotted line position. More specifically, the rectifier 14 will isolate the input lead 11 and one of the reversing switch arms 22 from the pulse applied to the input lead 10, and correspondingly the rectifier 13 will isolate the input lead 10 and the other of the reversing switch arms 22 from the pulse when it is applied to the input lead 11. The rectifier 15, on the other hand, isolates both the input leads 10 and 11 and the reversing switch means and control switch arm 21 from the potential of the battery 29.

The generated torque on the rotor R is a trigonometric function of the angle between the rotor magnetic field and the resultant magnetic field established by the two stator windings such that this torque is initially high and gradually reduces to zero as the rotor field approaches alignment with the resultant of the stator fields. Upon rotation of the resultant stator fields to a new position, the initial generated torque increases to a maximum to step the rotor another increment. The initial and terminal acceleration of a load secured to the rotor shaft is, therefore, relatively low as compared to stepper motor systems in which mechanical releases and stops are employed for controlling the incremental steps. Thus, acceleration and deceleration of the load secured to the rotor shaft of excess amounts is avoided, whereby increased life results.

In certain applications it may be desirable to provide a stepper motor which will rotate in equal discrete steps in response to pulses and in which the initial torque is always the same for each step. In this case, the circuit illustrated in Figure 7 may be employed. In Figure 7 electrical components which are identical to those shown in Figure 1 have been designated by the same numerals. The split stator windings 25 and 26 of Figure 1, however, have been replaced in Figure 7 by a single stator winding 38, the outer ends of which connect to the leads 23 and 24 up through the reversing switch arms 22 to a directional control reversing switch 39. This reversing switch 39 may be controlled by an independent relay 40 or may be manually controlled; its purpose will become clearer as the description proceeds. As shown in Figure 7, one of the switch arms 39 is grounded at 41 and the other switch arm connects through a lead 42 to the positive side of the battery 29.

The input leads 10 and 11 and corresponding rectifiers 13 and 14 of Figure 1 have been replaced in Figure 7 by a single input lead 43 connecting to the rectifier 15 and the control switch arm 21. Also, in Figure 7 the rotor includes a permanent magnet 44 for establishing a magnetic field rather than windings such as the winding 36 of Figure 1. It is to be understood, of course, that the rotor in Figure 7 could be electrically excited as in Figure 1; however, a permanent magnet is shown to illustrate the equivalence of the two rotors.

The operation of the circuit of Figure 7 is very similar to that of Figure 1 with the exception that the stator windings 38 and 33 are at all times excited and their direction is merely switched alternately and successively 180°. During the interval A as shown in Figure 7a and with the various switches in their solid line positions and the relays 16 and 17 de-energized, potential is applied from the battery 29 through the lead 42, one of the reversing switch arms 39 and one of the reversing switch arms 22, down lead 24 and through the coil 38, passing back up lead 23, the other of the reversing switch arms 22, and the other of the reversing switch arms 39 to ground at 41. The magnetic field established by stator winding 38 is indicated $\varphi_1$ in Figure 8. Similarly, a magnetic field is established by the stator winding 33 from potential applied by battery 29 through the reversing switch arms 27 and leads 31 and 32. This second magnetic field is designated $-\varphi_2$ in Figure 8. The resultant of these magnetic fields is in the direction of the vector M of Figure 8 and the rotor 44 will, therefore, align itself in this direction.

During the interval B, the pulse 12 is applied to the input lead 43 and, as in the case of the circuit of Figure 1, this pulse is applied simultaneously to the top of the two relay coils 16 and 17 and to the junction point of the relay coil 16 and resistance 18 by way of the control switch arm 21. Since the potential on both sides of the relay coil 16 is the same, this relay coil will remain de-energized. The relay coil 17, however, will be energized to move the reversing switch arms 27 and the holding switch arm 28 to their dotted line positions. Movement of the reversing switch arms 27 to their dotted line positions reverses the potential applied to the stator winding 33 so that the stator field $-\varphi_2$ is reversed as indicated by $\varphi_2$ in Figure 9. Since relay coil 16 remains de-energized, the field $\varphi_1$ established by stator winding 38 remains in the same direction as shown in Figure 9. Movement of the holding switch arm 28 to the dotted line position applies potential from the battery 29 through the lead 30 and the switch arm 28 to the top of the relay coils 16 and 17 thereby locking in the relay coil 17 but still not affecting the relay coil 16 during the interval B since the pulse 12 is still applied at the lower end of the coil.

The resultant of the fields $\varphi_1$ and $\varphi_2$ as shown in Figure 9 is in the direction of the vector M and the rotor 44 will, therefore, rotate 90° to the position of this vector.

Upon cessation of the pulse 12 the potential at the lower end of the relay coil 16 through the control switch arm 21 is removed and relay coil 16 is then energized by potential from the battery 29 passing through the holding switch arm 28 which is now in the dotted line position. Energization of relay coil 16 will throw the reversing switch arms 22 and the control switch arm 21 to their dotted line positions. Movement of the reversing switch arms 22 simply reverses the magnetic field established by the stator winding 38 so that there results a magnetic field $-\varphi_1$ as depicted in Figure 10. The relay coil 17 remains energized by potential from the battery 29 through the holding switch arm 28 to the top of this relay so that the magnetic field $\varphi_2$ remains in the same direction as shown in Figure 9 during the interval C.

Upon reception of the second pulse at the initiation of the interval D at the input terminal 43, potential will be applied through the control switch arm 21 which is now in the dotted line position to the junction of the relay coil 17 and resistance 19 thereby bucking the potential applied by the battery 29 through the holding switch arm 28 to the top of relay coil 17. Thus, relay coil 17 is de-energized and the reversing switch arms 27 and holding switch arm 28 return to their solid line positions. The application of this second pulse to the top of the relay coil 16 has no effect since relay coil 16 is already energized by a potential from the battery 29. With the return of the reversing switch arms 27 to their solid line positions, the field in the stator winding 33 is again reversed resulting in a magnetic field indicated as $-\varphi_2$ in Figure 11. The magnetic field $-\varphi_1$ from the winding 38 remains in the same direction as indicated in Figure 11. The rotor 44 is thus rotated again in a step of 90° to the position shown in Figure 11 and remains in such a position during the interval D.

Finally, upon cessation of the second pulse and the initiation of the interval E, the potential applied to the top of the relay coil 16 is removed and thus relay coil 16 is de-energized so that the reversing switch arms 22 and control switch arm 21 return to their solid line positions. With the reversing switch arms 22 again in their solid line positions, the magnetic field $-\varphi_1$ is again reversed to assume the position shown in Figure 12 which corresponds to its initial position shown in Figure 8. The field $-\varphi_2$ established by the coil 33 remains the same inasmuch as relay coil 17 is still de-energized and the reversing switch arms 27 are in their solid line positions. The resultant vector M is again rotated through the 90° step to its initial position.

It is thus seen that the arrangement of Figure 7 provides a stepper motor control in which discrete steps of equal value are provided. In the event it were desired to step the motor in the opposite direction, the reversing switch arms 39 may be manually or, if desired, electrically actuated to their dotted line positions to reverse the connections from the battery 29 and the ground connection 41 to the stator winding 38. With the reversing switch arms 39 in their dotted line position the sequence of events would be precisely as described previously except that the magnetic field $\varphi_1$ would initially be pointing down during intervals A and B and up during intervals C and D whereby the rotor would be stepped around in a counter-clockwise direction rather than a clockwise direction.

Other modifications within the scope and spirit of the present invention will readily occur to those skilled in the art. For example, higher speed switching and actuating means such as vacuum tubes, or transistors may be employed in place of the relay coils and switches. This invention, therefore, is not to be thought of as limited to the particular incremental stepper motor components described for illustrative purposes.

What is claimed is:
1. An incremental stepper motor adapted to rotate a shaft through discrete angles in response to electrical pulses, comprising, in combination: a first stator winding connected to establish a first magnetic field in a given direction; a second stator winding connected to a source of electrical potential to establish a second magnetic field at right angles with respect to said first magnetic field; first actuating means; first reversing switch means responsive to operation of said first actuating means for reversing the connections to said first stator winding; second actuating means; second reversing switch means responsive to operation of said second actuating means for reversing the connections to said second stator winding; a rotor connected to said shaft, said rotor including means to establish a magnetic field interacting with said first and second magnetic fields whereby said rotor will rotate to a position to align its magnetic field with the resultant of said first and second magnetic fields; control switch means responsive to energization of said first actuating means for rendering inoperative said second actuating means; holding switch means responsive to energization of said second actuating means for energizing said first actuating means; and input means for applying said electrical pulses to said first and second actuating means.

2. A motor according to claim 1, in which said first stator winding comprises split coils grounded at their inner ends and having their outer ends connected to said first reversing switch means, and said input means is connected for applying pulses to said split coils through said first reversing switch means, whereby upon reception of a first pulse said second actuating means is energized to reverse said second magnetic field, said pulse being applied directly to one of said split coils to establish said first magnetic field; said holding switch means being actuated to energize said first actuating means upon cessation of said first pulse, actuation of said first actuating means reversing the connections to said split coils thereby reversing said first magnetic field 180°, said magnetic field reversals establishing a resultant magnetic field which first rotates 135° for the duration of said pulse and thence another 45° at the cessation of said pulse whereby said rotor is rotated in steps of 135° and 45°; reception of a second pulse rendering said second actuating means inoperative through said control switch means thereby again reversing the connections to said second stator winding and moving said holding switch to its inoperative position whereby said source of electrical energy is no longer applied to said first actuating means, cessation of said second pulse rendering said first actuating means inoperative to again reverse the connections to said split coils whereby the resultant magnetic field is rotated through 135° and 45° steps to rotate said rotor in further steps of 135° and 45° to bring it back to its initial position, said complete cycle being repeated as each successive pair of pulses is received.

3. A motor according to claim 1, in which said first stator winding is connected through said first reversing switch means to said source of electrical potential, whereby upon reception of a first pulse said second actuating means is energized to reverse the connections to said second stator winding thereby rotating said second magnetic field 180°, said holding switch means applying said source of electrical potential to said first actuating means so that upon cessation of said pulse said first actuating means is energized to reverse the connections to said first stator winding thereby rotating said first magnetic field 180°, said magnetic field rotations establishing a resultant magnetic field which first rotates 90° for the duration of said pulse and thence another 90° at the cessation of said pulse whereby said rotor is rotated in steps of 90°, reception of a second pulse rendering said second actuating means inoperative through said control switch means thereby again reversing the connections to said second stator winding and moving said holding switch to its inoperative position whereby said source of electrical potential is no longer applied to said first actuating means, cessation of said second pulse rendering said first actuating means inoperative to again reverse the connections to said first stator winding whereby said resultant magnetic field is rotated through another 180° in 90° steps to rotate said rotor further, in steps of 90° to bring it back to its initial position, said complete cycle being repeated as each successive pair of pulses is received.

4. A motor according to claim 1, in which said rotor includes an electrically energized winding for establishing the rotor magnetic field.

5. A motor according to claim 1, in which said rotor comprises a permanent magnet for establishing the rotor magnetic field.

6. A motor according to claim 2, in which said input means includes first and second input leads connected to said first reversing switch means; a pair of rectifiers branching off from said first and second input leads respectively, and having a common output junction point; a connection from said junction point to said control switch means; said first and second actuating means comprising first and second relay coils having serially connected first and second resistances respectively grounded; said relays being arranged to actuate said first and second reversing switch means respectively, and said control switch means and said holding switch means respectively; a third rectifier connected from said junction point to both the first and second relays; said control switch means being adapted to switch between one terminal connected to the junction point of said first relay coil and said first resistance and a second terminal connected to the junction point of said second relay coil and said second resistance whereby said rotor will rotate in one direction when said pulses are applied to said first input lead and will rotate in an opposite direction when said input pulses are applied to said second input lead.

7. A motor according to claim 3, in which said input means includes an input lead connected to said control switch means, said first and second actuating means comprising first and second relay coils having first and second serially connected resistances respectively grounded; said relays being arranged to actuate said first and second reversing switch means respectively, and said control switch means and said holding switch means respectively; a rectifier connected from said input terminal to both said first and second relay coils, said control switch means being adapted to switch between one terminal connected to the junction point of said first relay coil and said first resistance and a second terminal connected to the junction point of said second relay coil and said second resistance; and directional controlling reversing switch means connected between said source of electrical potential and said first reversing switch means whereby said rotor will rotate in one direction when said directional controlling reversing switch means are in one position and will rotate in an opposite direction when said directional controlling reversing switch means are in their other position.

8. A control system adapted to establish potentials of given polarities in response to electrical pulses, comprising, in combination: first terminal leads connected to provide a first potential of given polarity; second terminal leads connected to provide a second potential of given polarity; first actuating means; first reversing switch means responsive to operation of said first actuating means for reversing the connections to said first terminal leads; second actuating means; second reversing switch means responsive to operation of said second actuating means for reversing the connections to said second terminal leads; control switch means responsive to energization of said first actuating means for rendering inoperative said second actuating means; holding switch means responsive to energization of said second actuating means for energizing said first actuating means; and input means for applying said electrical pulses to said first and second actuating means.

9. A control system according to claim 8, in which said input means includes first and second input leads connected to said first reversing switch means; a pair of rectifiers branching off from said first and second input leads respectively, and having a common output junction point; a connection from said junction point to said control switch means; said first and second actuating means comprising first and second relay coils having serially connected first and second resistances respectively grounded; said relays being arranged to actuate said first and second reversing switch means respectively, and said control switch means and said holding switch means respectively; a third rectifier connected from said junction point to both the first and second relays; said control switch means being adapted to switch between one terminal connected to the junction point of said first relay coil and said first resistance and a second terminal connected to the junction point of said second relay coil and said second resistance whereby the initial polarity applied to said first terminal leads is of one sign when said pulses are applied to said first input lead and of an opposite sign when said input pulses are applied to said second input lead.

10. A control system according to claim 8, in which said input means includes an input lead connected to said control switch means, said first and second actuating means comprising first and second relay coils having first and second serially connected resistances respectively grounded; said relays being arranged to actuate said first and second reversing switch means respectively, and said control switch means and said holding switch means respectively; a rectifier connected from said input terminal to both said first and second relay coils, said control switch means being adapted to switch between one terminal connected to the junction point of said first relay coil and said first resistance and a second terminal connected to the junction point of said second relay coil and said second resistance; a source of electrical potential; and directional controlling reversing switch means connected between said source of electrical potential and said first reversing switch means whereby the initial polarity applied to said first terminal leads is of one sign when said directional controlling reversing switch means are in one position and of an opposite sign when said directional controlling reversing switch means are in their other position.

References Cited in the file of this patent
UNITED STATES PATENTS 2,706,270    Steele _____ Apr. 12, 1955